United States Patent
Marcos Izquierdo

(10) Patent No.: US 12,259,038 B2
(45) Date of Patent: Mar. 25, 2025

(54) MECHANICAL PART FOR AN AIRCRAFT TURBOMACHINE

(71) Applicant: SAFRAN TRANSMISSION SYSTEMS, Colombes (FR)

(72) Inventor: Juan-Luis Marcos Izquierdo, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 17/832,899

(22) Filed: Jun. 6, 2022

(65) Prior Publication Data
US 2022/0390005 A1    Dec. 8, 2022

(30) Foreign Application Priority Data

Jun. 7, 2021    (FR) ........................................ 2105968

(51) Int. Cl.
*F16H 57/04*    (2010.01)
*F02C 7/36*    (2006.01)

(52) U.S. Cl.
CPC ..... *F16H 57/0486* (2013.01); *F16H 57/0423* (2013.01); *F16H 57/045* (2013.01); *F02C 7/36* (2013.01); *F05D 2260/40311* (2013.01); *F05D 2300/611* (2013.01)

(58) Field of Classification Search
CPC .......... F05D 2260/98; F05D 2300/611; F16H 57/0486; C09D 5/1681
See application file for complete search history.

(56) References Cited

U.S. PATENT DOCUMENTS

| | | | |
|---|---|---|---|
| 9,121,307 B2* | 9/2015 | Aizenberg | A61L 27/50 |
| 10,859,155 B2* | 12/2020 | Clark | F01D 25/18 |
| 11,022,209 B2* | 6/2021 | Baraggia Au Yeung | ...... F16H 57/0486 |
| 2014/0106922 A1* | 4/2014 | Hancox | F01D 25/18 475/159 |
| 2020/0166118 A1* | 5/2020 | Di Giovanni | F16H 57/0482 |
| 2020/0309032 A1 | 10/2020 | Mason et al. | |

FOREIGN PATENT DOCUMENTS

JP    2011-112145 A    6/2011
JP    2011-185322 A    9/2011

OTHER PUBLICATIONS

France Search Report mailed Jan. 24, 2022, issued in Application No. FR2105968, filed Jun. 7, 2021, 3 pages.

* cited by examiner

*Primary Examiner* — Derek D Knight
(74) *Attorney, Agent, or Firm* — CHRISTENSEN O'CONNOR JOHNSON KINDNESS PLLC

(57) ABSTRACT

A mechanical part for an aircraft turbomachine is made of metal and includes at least one profiled surface configured to ensure an oil flow during operation. The surface has a hydrophobic and/or lipophobic coating or a surface texturing rendering the surface hydrophobic and/or lipophobic.

14 Claims, 8 Drawing Sheets

MECHANICAL PART FOR AN AIRCRAFT TURBOMACHINE

CROSS-REFERENCE TO RELATED APPLICATION

This application claims priority to FR 2105968, filed Jun. 7, 2021, the disclosure of which is hereby expressly incorporated by reference herein in its entirety.

TECHNICAL FIELD

The present disclosure relates to a mechanical part for an aircraft turbomachine, and in particular to a part intended to ensure an oil flow during operation.

BACKGROUND

The prior art comprises in particular the documents JP-A-2011 112145, JP-A-2011 185322, US-A1-2020/309032, WO-A1-2010/092263, FR-A1-2 987 416, FR-A1-3 041 054 and FR-A1-3 076 853.

An aircraft turbomachine consumes in particular oil to operate. This oil is for example necessary to ensure the lubrication of mechanical parts, such as bearings or gears, and can also be used to cool these parts.

Some mechanical parts of an aircraft turbomachine comprise profiled surfaces to ensure an oil flow during operation. This is the case, for example, for the oil deflectors or collectors of a mechanical reduction gear.

The role of a mechanical reduction gear is to modify the gear and torque ratio between the input shaft and the output shaft of a mechanical system.

A mechanical reduction gear comprises a central sprocket, referred to as sun gear, a ring gear and sprockets referred to as planet gears, which are engaged between the sun gear and the ring gear. The planet gears are maintained by a chassis referred to as planet carrier. The sun gear, the ring gear and the planet carrier are planetary gears because their axes of revolution coincide with the longitudinal axis X of the turbomachine. The planet gears each have a different axis of revolution and are equally distributed on the same operating diameter around the axis of the planetary gears. These axes are parallel to the longitudinal axis X.

There are several reduction gear architectures. In the prior art of the double-flow turbomachines, the reduction gears are of the planetary or epicyclic type. In other similar applications, there are architectures referred to as differential or "compound".

- on a planetary reduction gear, the planet carrier is stationary and the ring gear is the output shaft of the device which rotates in the opposite direction of the sun gear.
- on an epicyclic reduction gear, the ring gear is stationary and the planet carrier is the output shaft of the device which rotates in the same direction as the sun gear.
- on a compound reduction gear, no element is attached in rotation. The ring gear rotates in the opposite direction of the sun gear and of the planet carrier.

The reduction gears can consist of one or more gear stages. This meshing is ensured in different ways such as by contact, friction or magnetic field. There are several types of meshing by contact such as straight or herringbone toothings.

The meshings of the reduction gears are lubricated with oil. The lubricating oil is heated during operation because it absorbs heat energy generated by the reduction gear. The temperature of the oil has an impact on its viscosity and on its lubrication efficiency. It is therefore important to evacuate the hot oil after lubrication of the reduction gear, so that it can be recycled.

However, once lubricated, the planet gears of the reduction gear centrifugally spray hot oil to the adjacent planet gears. This oil recirculation has several disadvantages: increase in the losses by ventilation of the reduction gear, increase in the temperature of the planet gears, reduction in the margin against seizure, increase in the oil outlet temperature for the sizing of the exchangers, higher air rate in the oil, higher oil consumption which reduces the low oil level in the oil reservoirs, etc.

One solution to this problem is to arrange oil deflectors or collectors between the planet gears. The purpose of the deflectors is to divert the sprayed oil towards oil evacuation and recycling means. The purpose of the oil collectors is to collect the sprayed oil and to convey it towards the oil evacuation and recycling means.

A reduction gear oil collector generally comprises a body comprising two opposing side surfaces configured to extend partly around planet gears of the reduction gear, the collector may further comprise an internal oil circulation cavity connected to oil inlets located on the side faces and to at least one oil outlet.

This collector must evacuate the oil efficiently otherwise the space between the planet gears and the collector will be saturated with oil. This phenomenon results in the bubbling of the planet gears and leads to the same harmful consequences listed above.

It is therefore important that the oil flows as quickly as possible over the side surfaces of the collectors and, more generally, over the surfaces of the mechanical parts configured to ensure an oil flow during operation. An oil that flows too slowly over the surfaces may also be disturbed by the ventilation air that circulates through the mechanical reduction gear during operation.

These mechanical parts are usually made of metal. The spreading coefficient of the oil on a metal surface is relatively high so that the oil that flows on such a surface tends to spread on the surface. The spreading of the oil on the surface is related to the lipophilic character of the metal surface.

The disclosed subject matter proposes a simple, effective and economical solution that allows to facilitate the oil flow on an aircraft turbomachine mechanical part.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The disclosed subject matter relates to a mechanical part for an aircraft turbomachine, this mechanical part being made of metal and comprising at least one profiled surface configured to ensure an oil flow during operation, characterised in that the part is an oil deflector or collector for a mechanical reduction gear, and in that said surface is intended to be arranged facing a planet gear of the reduction gear and comprises a coating that is more hydrophobic and/or lipophobic than said surface or a surface texturing rendering said surface more hydrophobic and/or lipophobic.

The coating or the surface texturing allows to render the flow surface of the oil hydrophobic and/or lipophobic. This allows to reduce the spreading coefficient of the oil on the surface and thus favours the formation of drops for example rather than the spreading of the oil on the surface which then forms a film. This allows to facilitate the flow of the oil over the surface that does not "cling" to the surface and thus accelerates this flow. The acceleration of the oil on the surface allows to limit the impact of the ventilation air on this oil. It can also allow to accelerate the oil evacuation and its recycling and thus allow to reduce the amount of oil consumed during operation of the turbomachine.

The mechanical part according to embodiments of the disclosed subject matter may comprise one or more of the following characteristics, taken alone from each other, or in combination with each other:

said surface is concave curved;
said coating or said texturing extends over only a portion of said surface;
said coating or said texturing extends over the entirety of said surface;
the part comprises two opposing side surfaces which are profiled and configured to ensure an oil flow during operation, each of these side surfaces comprising a hydrophobic and/or lipophobic coating or a surface texturing rendering said surface hydrophobic and/or lipophobic;
each of said surfaces is intended to be arranged facing a planet gear of the reduction gear;
the hydrophobic and/or lipophobic coating is made of polymer, in particular PTFE;
the surface texturing comprises a surface repetition of hollowed or bumpy patterns of micrometric dimensions, made for example by laser;
the part comprises an internal oil circulation cavity;
the part comprises a metal body, preferably a one-piece.

The present disclosure also relates to a mechanical reduction gear for an aircraft turbomachine, comprising a sun gear, a ring gear extending around the sun gear, planet gears meshed with the sun gear and the ring gear, and a mechanical part as described above, the mechanical part having said surface arranged facing a planet gear so as to form an oil deflector.

The disclosure further relates to a turbomachine, in particular for an aircraft, comprising a mechanical part or a mechanical reduction gear as described above.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the disclosure.

Figure 1:
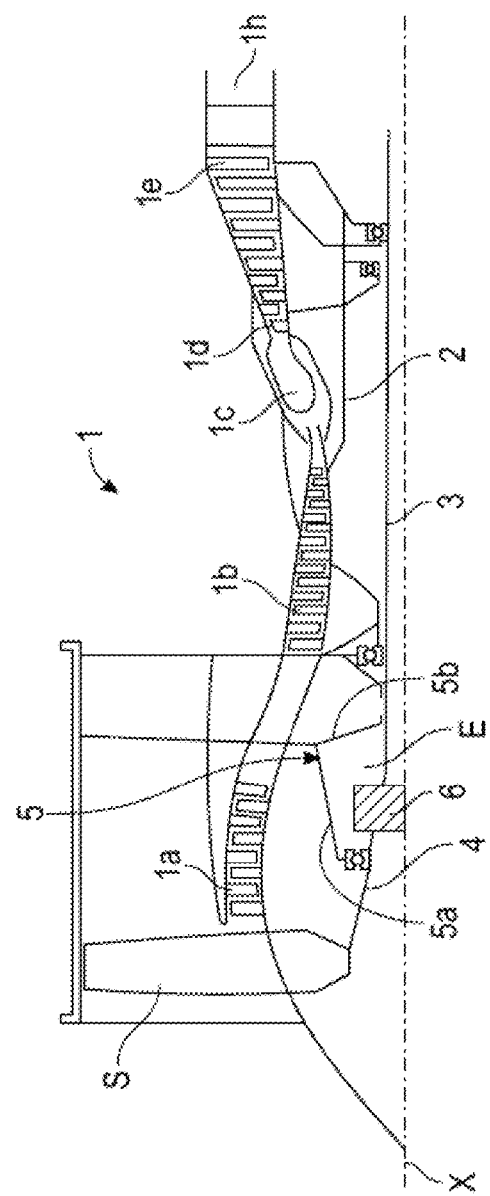
FIG. 1 is a schematic axial cross-sectional view of a turbomachine using the disclosed mechanical part for an aircraft turbomachine.

FIG. 1 describes a turbomachine 1 which conventionally comprises a fan S, a low-pressure compressor 1$a$, a high-pressure compressor 1$b$, an annular combustion chamber 1$c$, a high-pressure turbine 1$d$, a low-pressure turbine 1$e$ and an exhaust nozzle 1$h$. The high-pressure compressor 1$b$ and the high-pressure turbine 1$d$ are connected by a high-pressure shaft 2 and together they form a high-pressure (HP) body. The low-pressure compressor 1$a$ and the low-pressure turbine 1$e$ are connected by a low-pressure shaft 3 and together they form a low-pressure (LP) body.

The fan S is driven by a fan shaft 4 which is driven to the LP shaft 3 by means of a reduction gear 6. This reduction gear 6 is generally of the planetary or epicyclic type.

Although the following description concerns a reduction gear of the planetary or epicyclic type, it also applies to a mechanical differential in which the three components, namely the planet carrier, the ring gear and the sun gear, can be rotatable, the rotational speed of one of these components depending in particular on the difference in speed of the other two components.

The reduction gear 6 is positioned in the upstream portion of the turbomachine. A stationary structure comprising schematically, here, an upstream portion 5$a$ and a downstream portion 5$b$ which makes up the engine casing or stator 5 is arranged so as to form an enclosure E surrounding the reduction gear 6. This enclosure E is here closed upstream by seals at the level of a bearing allowing the passage of the fan shaft 4, and downstream by seals at the level of the passage of the LP shaft 3.

Figure 2:
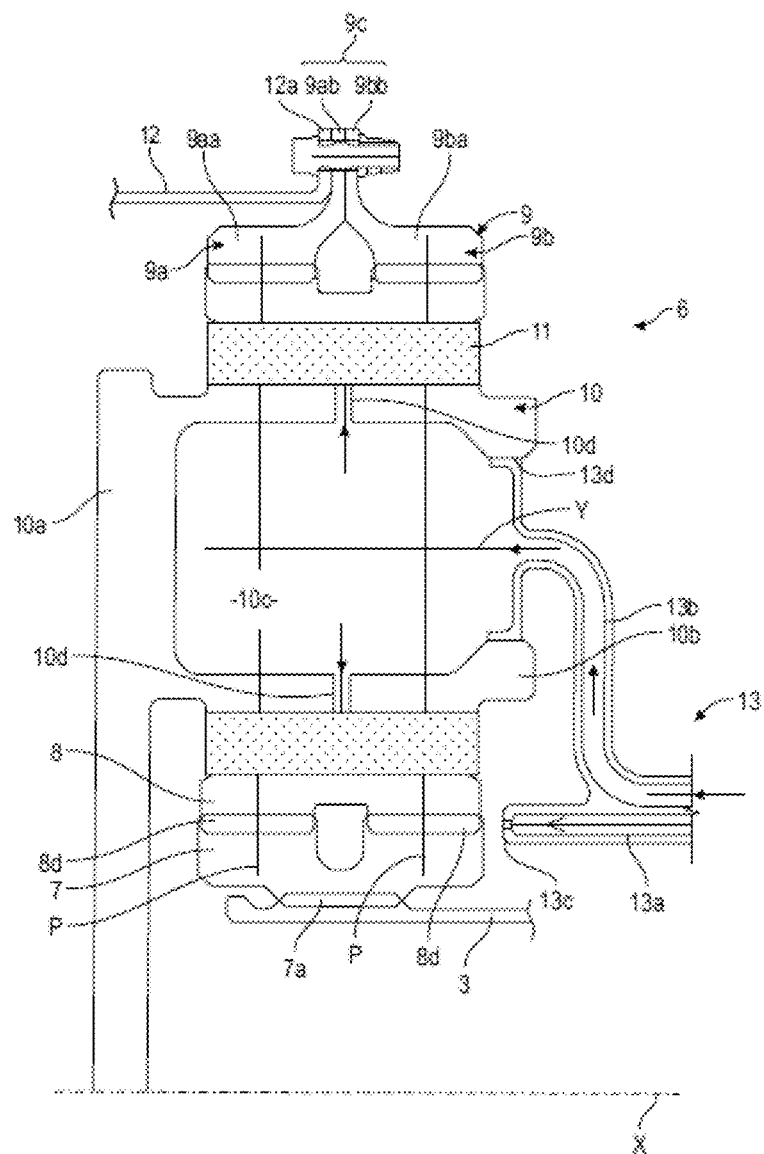
FIG. 2 is a partial schematic view of a mechanical reduction gear in axial section.

FIG. 2 shows a reduction gear 6 which can take the form of different architectures depending on whether certain part are stationary or in rotation. The input of the reduction gear 6 is connected to the LP shaft 3, for example by means of internal splines 7$a$. Thus, the LP shaft 3 drives a planetary sprocket referred to as the sun gear 7. Classically, the sun gear 7, whose axis of rotation is coincident with that of the turbomachine X, drives a series of sprockets referred to as planet gears 8, which are equally distributed on the same diameter around the axis of rotation X. This diameter is equal to twice the operating centre distance between the sun gear 7 and the planet gears 8. The number of planet gears 8 is generally defined between three and seven for this type of application.

The assembly of the planet gears 8 is maintained by a chassis referred to as planet carrier 10. Each planet gear 8 rotates around its own axis Y, and meshes with the ring gear 9.

In the output we have:
in an epicyclic configuration, the assembly of the planet gears 8 drives the planet carrier 10 in rotation around the axis X of the turbomachine. The ring gear is attached to the engine casing or stator 5 via a ring gear carrier 12 and the planet carrier 10 is attached to the fan shaft 4.

in a planetary configuration, the assembly of the planet gears 8 is maintained by a planet carrier 10 which is attached to the engine casing or stator 5. Each planet gear drives the ring gear which is fitted to the fan shaft 4 via a ring gear carrier 12.

Each planet gear 8 is mounted freely in rotation by means of a bearing 11, for example of the rolling or hydrostatic bearing type. Each bearing 11 is mounted on one of the axles 10b of the planet carrier 10 and all the axles are positioned relative to each other using one or more structural chassis 10a of the planet carrier 10. There are a number of axles 10b and bearings 11 equal to the number of planet gears. For reasons of operation, assembly, manufacture, inspection, repair or replacement, the axles 10b and the chassis 10a can be separated into several parts.

For the same reasons mentioned above, the toothing 8d of a reduction gear can be separated into several propellers each with a median plane P. In our example, we detail the operation of a reduction gear with several propellers with one ring gear separated into two half-ring gears:

an upstream half-ring gear 9a consisting of a rim 9aa and an attachment half-flange 9ab. On the rim 9aa there is the upstream propeller of the toothing of the reduction gear. This upstream propeller meshes with that of the planet gear 8 which meshes with that of sun gear 7.

a downstream half-ring gear 9b consisting of a rim 9ba and an attachment half-flange 9bb. On the rim 9ba is the downstream propeller of the toothing of the reduction gear. This downstream propeller meshes with that of the planet gear 8 which meshes with that of the sun gear 7.

If the propeller widths vary between the sun gear 7, the planet gears 8 and the ring gear 9 because of the toothing overlaps, they are all centred on a median plane P for the upstream propellers and on another median plane P for the downstream propellers. In the other figures, in the case of a rolling with two-rows of rolls, each row of rolling-elements is also centred on two median planes.

The attachment half-flange 9ab of the upstream ring gear 9a and the attachment half-flange 9bb of the downstream ring gear 9b form the attachment flange 9c of the ring gear. The ring gear 9 is attached to a ring gear carrier by assembling the attachment flange 9c of the ring gear and the attachment flange 12a of the ring gear carrier by means of a bolted mounting, for example.

Figure 3:
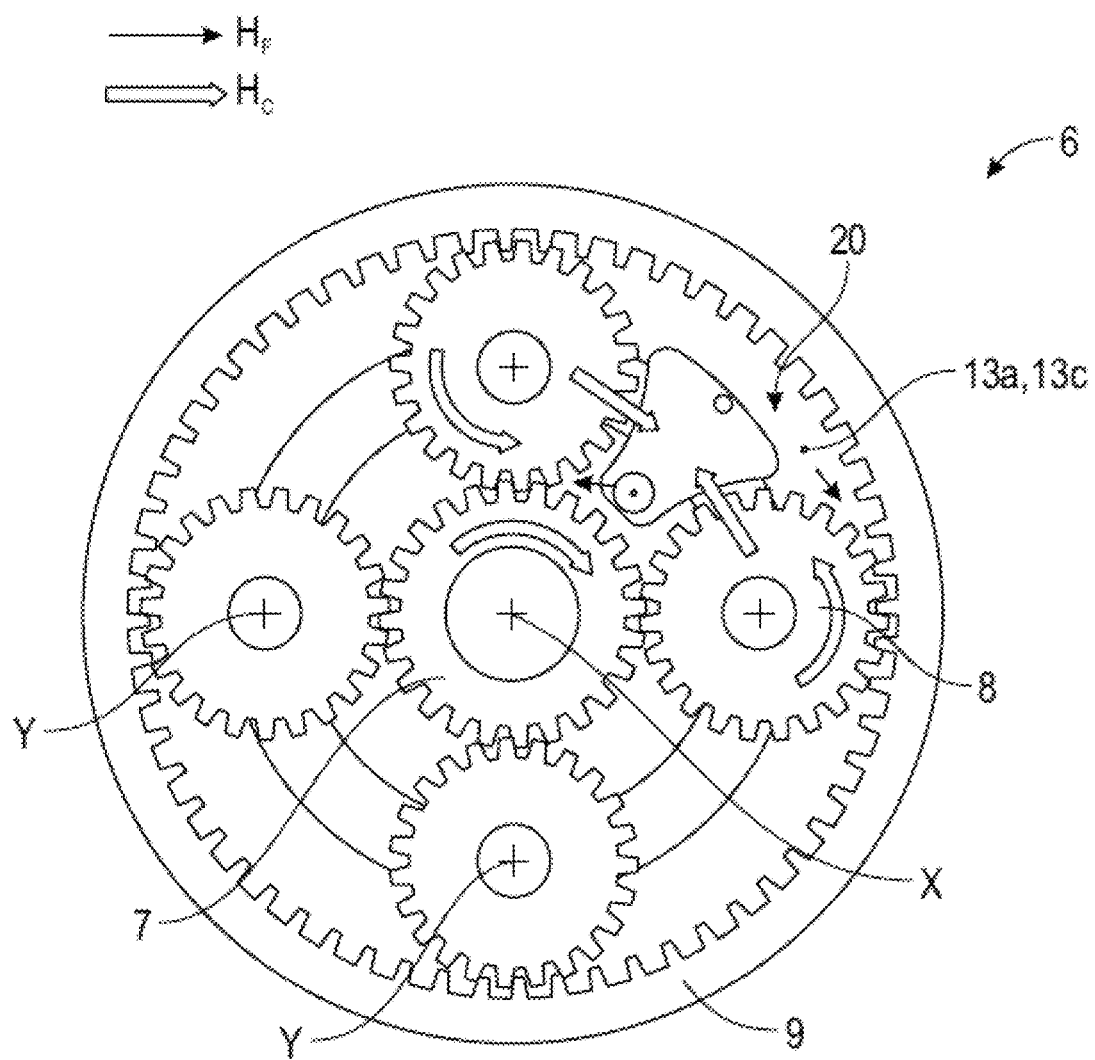
FIG. 3 is a schematic cross-sectional view of a mechanical reduction gear.

The arrows in FIG. 2 describe the conveying of the oil in the reduction gear 6. The oil arrives in the reduction gear 6 from the stator portion 5 in the dispenser 13 by different means which will not be specified in this view because they are specific to one or several types of architecture. The dispenser is separated into 2 portions, each of which is generally repeated with the same number of planet gears. The function of the injectors 13a is to lubricate the toothings and the function of the arms 13b is to lubricate the bearings. The oil is fed towards injectors 13a and emerges from the ends 13c to lubricate with oil referred to as cold ($H_F$) the toothings of the planet gears 8, the sun gear 7 and also the ring gear 9 (FIG. 3). The oil is also fed towards the arm 13b and circulates through the feed opening 13d of the bearing. The oil then circulates through the axle into one or more buffer areas 10c and emerges through the orifices 10d in order to lubricate the bearings of the planet gears.

Due to the centrifugal forces, the oil referred to as hot $H_C$ for lubricating the toothings is sprayed radially outward in relation to the axes Y of the planet gears, as shown in FIG. 3. To prevent this oil from interfering with the lubrication of the adjacent planet gears 8, oil collectors 20 are arranged between the planet gears 8. Although FIG. 3 shows a single collector 20, the reduction gear comprises a collector between two adjacent planet gears and thus comprises as many collectors as there are planet gears, namely four in the example shown.

Figure 4:
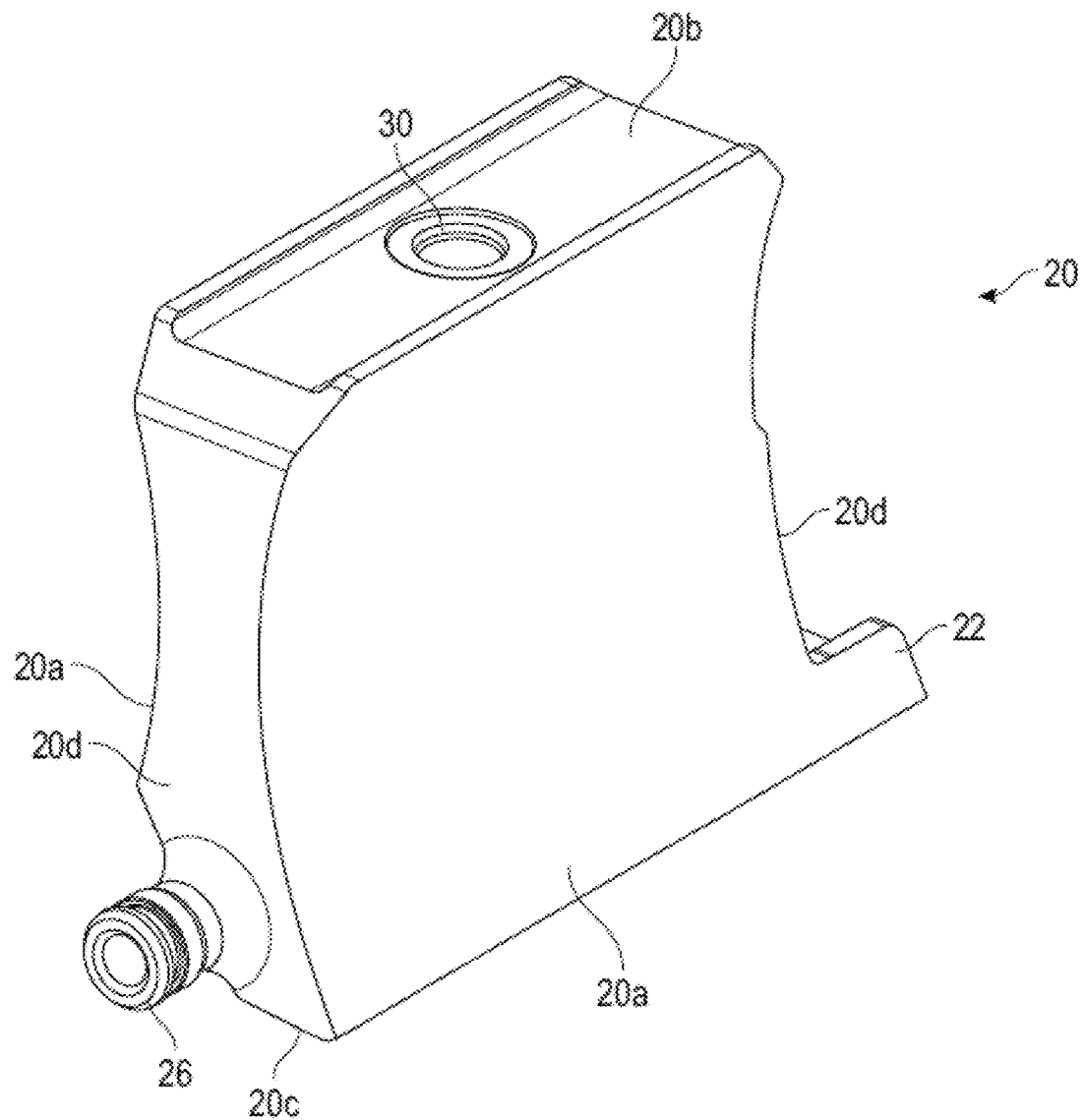
FIG. 4 is a schematic perspective view of a mechanical part which is a collector or deflector of a mechanical reduction gear.

FIG. 4 shows an example of embodiment of an oil collector 20.

The collector 20 comprises a body, here in one-piece, which comprises two opposing side surfaces 20a intended to extend partly around two adjacent planet gears 8. These side surfaces 20a advantageously have a concave curved shape whose radius of curvature can be centred on the axis Y of rotation of the planet gear 8 which this surface 20a faces.

The collector 20 further comprises an upper or radially external face 20b, here flat, intended to extend facing the ring gear 9 or a wall of a cage in the case where the sun gear 7 and the planet gears 8 of the reduction gear 6 are arranged in a cage.

The collector 20 further comprises a lower or radially internal face 20c, here flat, intended to extend facing the sun gear 7.

Finally, the collector 20 comprises two faces 20d, respectively upstream and downstream. As in the example shown, one of these faces 20d may comprise a member 22 for attachment to the reduction gear.

The opposite face 20d of the collector 20 may comprise a common oil outlet 26, which may be in the form of a tubular fluidic connection end-piece, for example. This end-piece can be configured to pass through a slot in the cage of the reduction gear, for example.

The collector 20 further comprises an internal oil circulation cavity (not visible) connected to the oil outlet 26 as well as to at least one oil inlet 30 located here on the face 20b.

Figure 5:
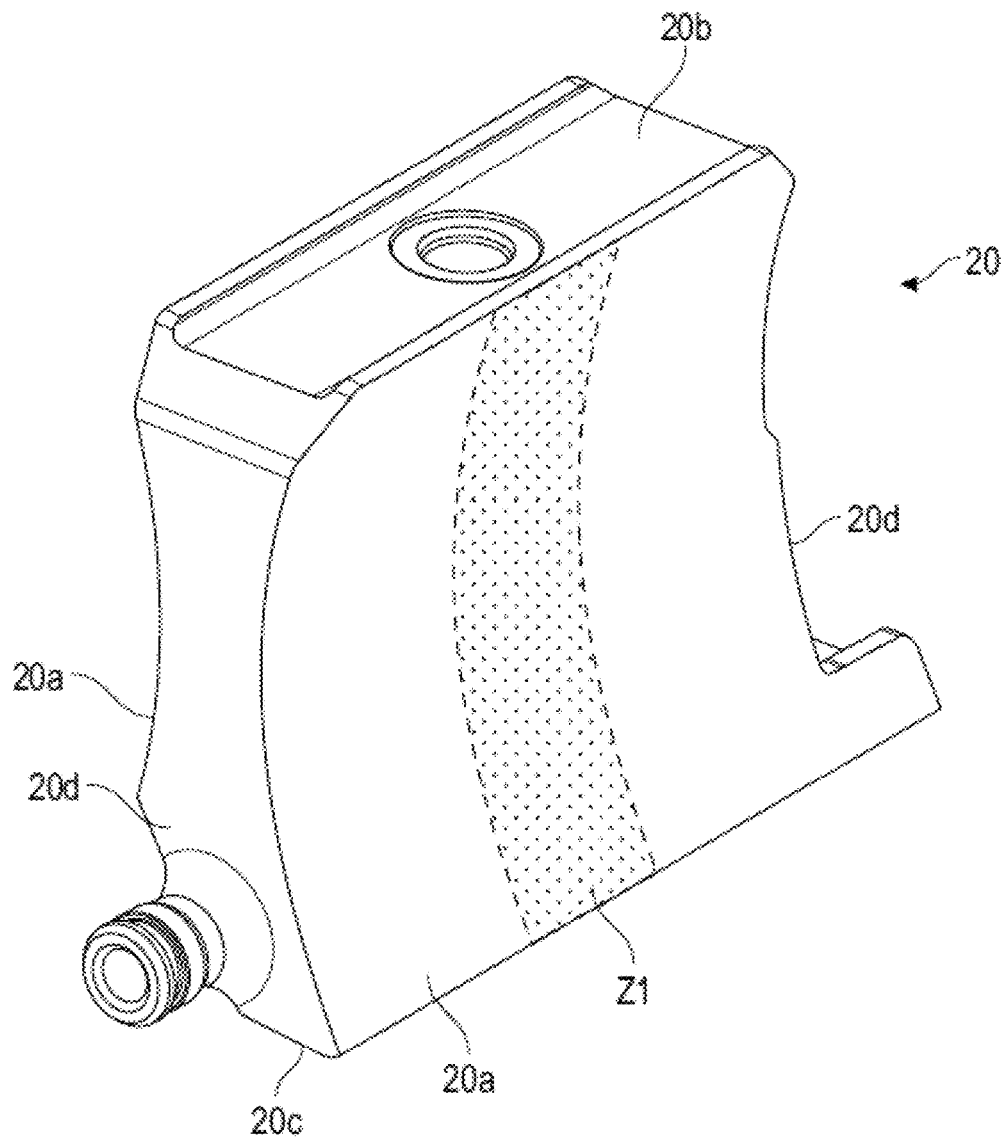
FIG. 5 is a view similar to that of FIG. 4 and shows a mechanical part according to a first embodiment of the present disclosure.

FIG. 5 shows a first embodiment of the present disclosure wherein a portion of each surface 20a comprises a hydrophobic and/or lipophobic coating or surface texturing rendering said surface hydrophobic and/or lipophobic.

As used in this description, the terms "hydrophobic" and "lipophobic" (and even "oleophobic") are used to refer to the ability of a surface to repel water and/or oil from said surface to decrease the contact surface area between the surface and the drop that is formed. Such properties allow to decrease the friction coefficient. The coating or the textured surface allows a smaller coefficient of friction between the surface of the water and/or the oil and the metal surface with the coating. More precisely, the lipophobic and/or hydrophobic character allows the fluid (water/oil/grease) to bead up (pearl shaped) when it is sprayed on the mechanical part, which contributes to a good evacuation of this fluid. Similarly, we also understand by "more lipophobic/hydrophobic" that the surface is less lipophilic/hydrophilic, i.e. the fluid will be less likely to spread/stay on the surface.

The coating or the texturing extends over an area Z1 that has an elongated strip shape.

In the example shown, the area Z1 is located in the middle of each surface 20a and extends away from the faces 20d and from the face 20c to the face 20b.

Figure 6:
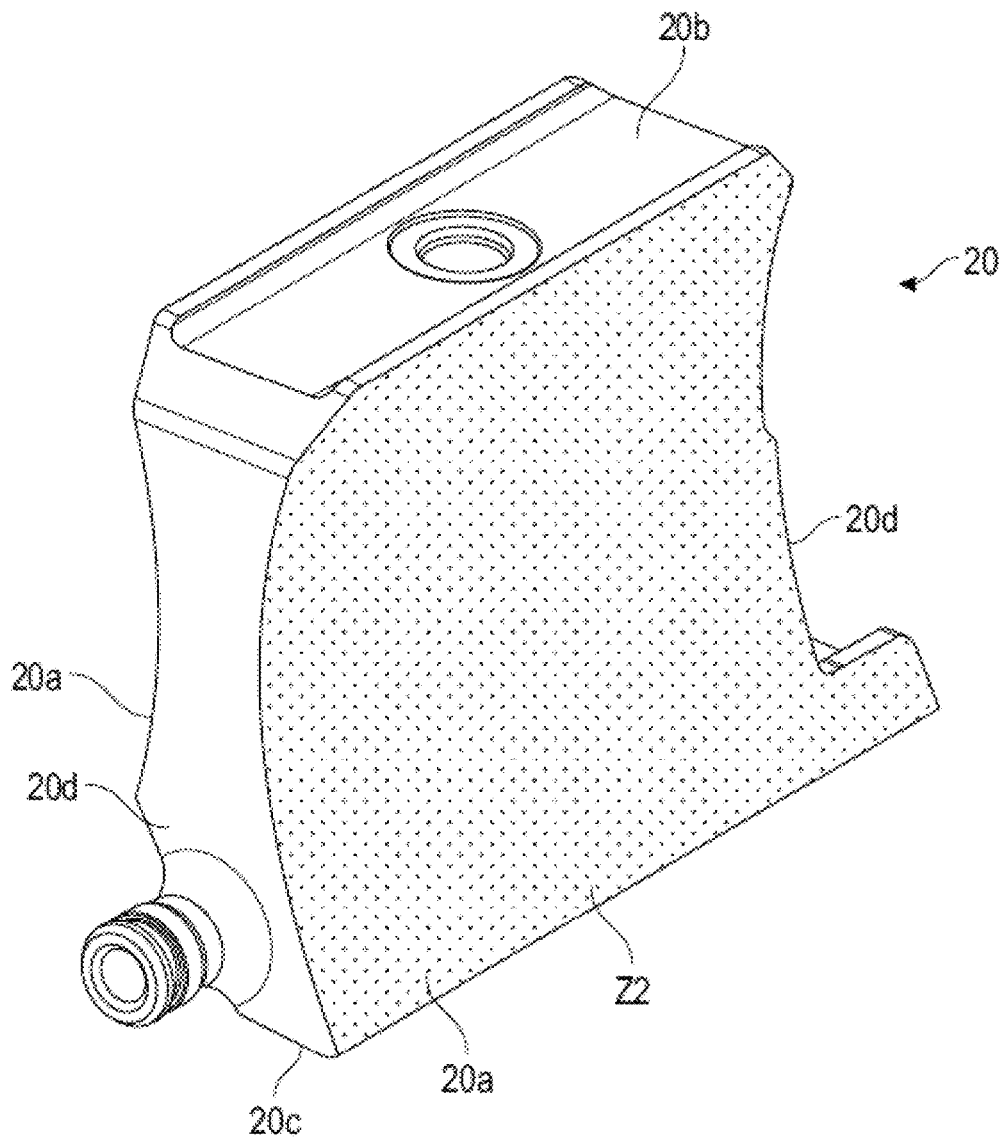
FIG. 6 is a view similar to that of FIG. 4 and shows a mechanical part according to a second embodiment of the present disclosure.

FIG. 6 shows a second embodiment of the present disclosure in which the entirety of each surface 20a comprises a hydrophobic and/or lipophobic coating or a hydrophobic and/or lipophobic surface texturing. This coating or this texturing thus extends over an area Z2 that corresponds to the entirety of each surface 20*a*. The area Z2 extends to the faces 20*d* and to the faces 20*c* and 20*b*.

Figure 7:
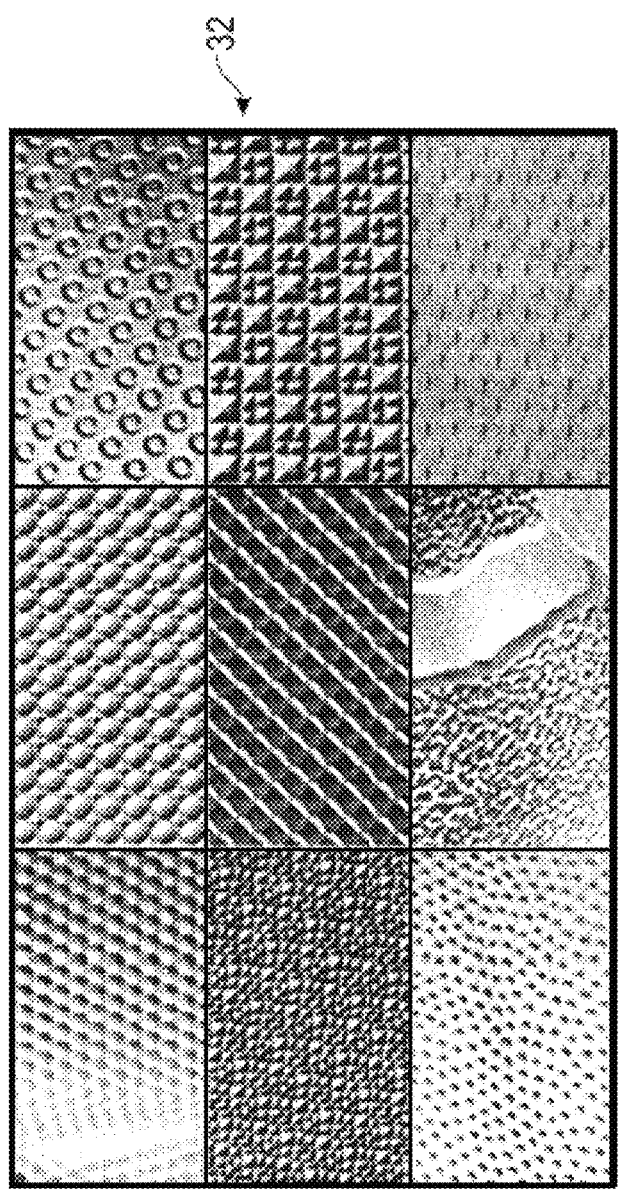
FIG. 7 is a very schematic view of examples of surface texturing for a mechanical part according to the present disclosure.

FIG. 7 shows examples of surface texturing 32 for the areas Z1 and Z2.

The surface texturing 32 preferably comprises a surface repetition of hollowed or bumpy patterns of micrometric dimensions. The patterns can be linear or punctual. This texturing 32 is for example carried out by laser micromachining. The hollowed or bumpy patterns allow to reduce the surface area of the surface in contact with the oil and thus reduce the friction of the oil with the surface.

Figure 8:
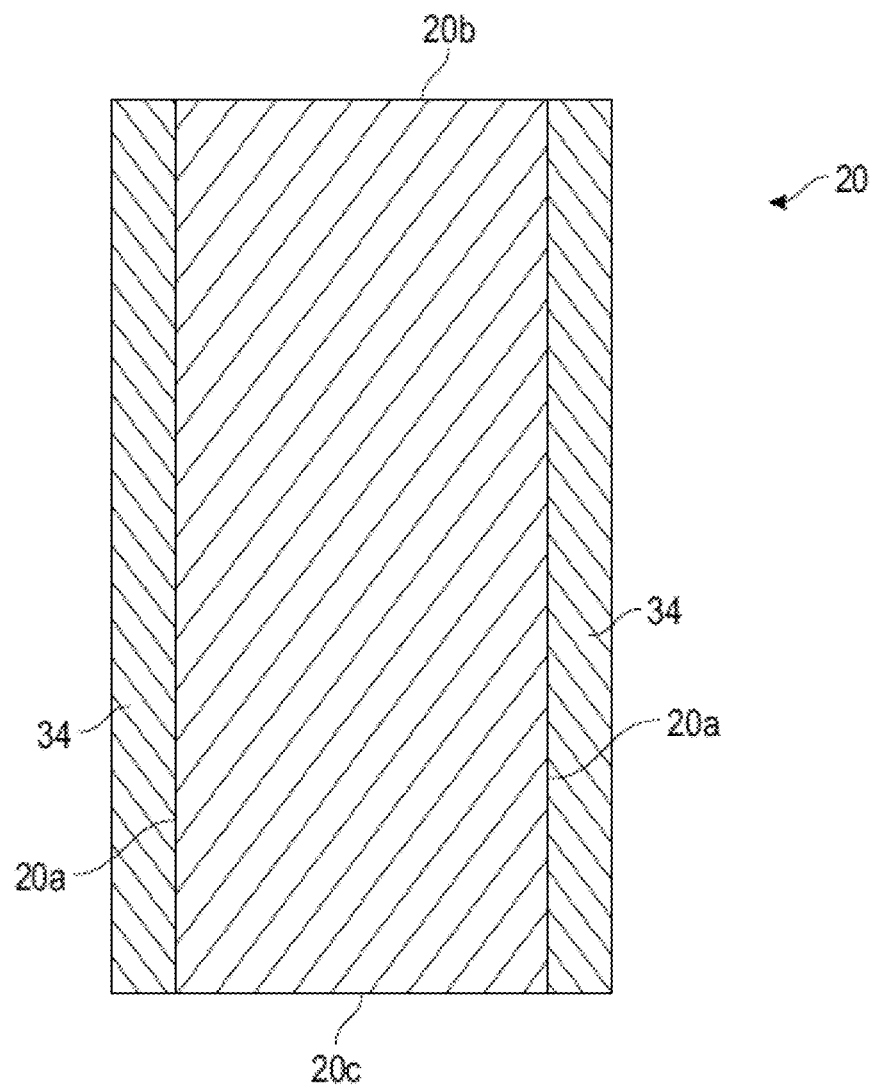
FIG. 8 is a very schematic cross-sectional view of a mechanical part according to the present disclosure, the surfaces of which comprise hydrophobic and/or lipophobic coatings.

FIG. 8 shows an example of a hydrophobic and/or lipophobic coating 34 for the areas Z1 and Z2.

The coating 34 is preferably made of polymer, and in particular PTFE. It has, for example, a thickness between 1 and 100μm. It can be obtained by spraying a solution onto each surface 20*d* and heating for the polymerization and the harden of the coating.

The coating 34 and the texturing provide the same advantages mentioned above. The advantage of the texturing with respect to the coating is that it does not introduce potential pollutants because the coating is susceptible to degrade during operation and to release unwanted elements into the engine.

The embodiments of the present disclosure in which an exclusive property or privilege is claimed are defined as follows:

1. A mechanical part for an aircraft turbomachine is made of metal and comprises at least one original non-roughened curved surface configured to ensure an oil flow during operation,
   wherein the part is an oil deflector or collector for a mechanical reduction gear, said original non-roughened curved surface is configured to be arranged facing a planet gear of the reduction gear,
   wherein said original non-roughened curved surface:
   either comprises a coating that is more hydrophobic and/or lipophobic than said original non-roughened curved surface,
   or comprises a surface texturing rendering said original non-roughened curved surface more hydrophobic and/or lipophobic, and
   wherein said coating covers said original non-roughened curved surface that is not roughened before coating, or said surface texturing is performed on said original non-roughened curved surface that is not roughened before texturing.

2. The mechanical part of claim 1, wherein said original non-roughened curved surface is concave.

3. The mechanical part of claim 1, wherein said coating or said texturing extends over only a portion of said original non-roughened curved surface.

4. The mechanical part according to claim 1, wherein said coating or said texturing extends over the entirety of said original non-roughened curved surface.

5. The mechanical part according to claim 1, further comprising two opposing side surfaces which are originally non-roughened and curved and which are configured to ensure an oil flow during operation, each of the two opposing side surfaces comprising said coating or said texturing.

6. The mechanical part according to claim 1, wherein said coating is made of polymer.

7. The mechanical part according to claim 6, wherein said coating is made of PTFE.

8. The mechanical part according to claim 1, wherein said texturing comprises a surface repetition of hollowed or bumpy patterns of micrometric dimensions.

9. The mechanical part according to claim 8, wherein said texturing is made by laser.

10. The mechanical part according to claim 1, further comprising an internal oil circulation cavity.

11. A mechanical reduction gear for an aircraft turbomachine, comprising a sun gear, a ring gear extending around the sun gear, planet gears meshed with the sun gear and the ring gear, and the mechanical part according to claim 1, said mechanical part having said surface arranged facing said planet gear so as to form said oil deflector.

12. A turbomachine comprising the mechanical part according to claim 1.

13. The turbomachine according to claim 12, wherein the turbomachine is part of an aircraft.

14. A mechanical part for an aircraft turbomachine is made of metal and comprises at least one original non-roughened curved surface configured to ensure an oil flow during operation, wherein the part is an oil deflector or collector for a mechanical reduction gear, said original non-roughened curved surface is configured to be arranged facing a planet gear of the reduction gear, and wherein said original non-roughened curved surface:
   either is coated with a coating that is more hydrophobic and/or lipophobic than said original non-roughened curved surface,
   or is textured and is non-coated after texturing so as to render said original non-roughened curved surface more hydrophobic and/or lipophobic than said original non-roughened curved surface,
   wherein said coating covers said original non-roughened curved surface that is not roughened before coating, or said surface texturing is performed on said original non-roughened curved surface that is not roughened before texturing.

* * * * *